(12) United States Patent
Papiska et al.

(10) Patent No.: US 6,445,161 B1
(45) Date of Patent: Sep. 3, 2002

(54) CYCLIC BATTERY CHARGER USING CONTINUOUS BATTERY DISCHARGE

(75) Inventors: Ron Papiska; Kevin Dotzler, both of San Diego, CA (US)

(73) Assignee: Denso Corporation (JP)

(*) Notice: Subject to any disclaimer, the term of this patent is extended or adjusted under 35 U.S.C. 154(b) by 0 days.

(21) Appl. No.: 09/924,258

(22) Filed: Aug. 6, 2001

(51) Int. Cl.⁷ .................. H01M 10/44; H01M 10/46
(52) U.S. Cl. ........................................ 320/130
(58) Field of Search .......................... 320/124, 125, 320/128, 129, 130, 139, 145

(56) References Cited

U.S. PATENT DOCUMENTS 5,654,622 A * 8/1997 Toya et al.
5,998,968 A * 12/1999 Pittman et al.

* cited by examiner

Primary Examiner—Edward H. Tso
(74) Attorney, Agent, or Firm—Fish & Richardson P.C.

(57) ABSTRACT

A cyclic battery charger reduces the formation of the ionic barrier in a battery. The battery charger applies a current to the battery for a first period of time. To reduce the ionic barrier, a discharge current is applied to the battery for a second period of time. The charging current and discharging current are applied cyclically to the battery during the entire charging period. The discharge current may be applied by the battery charger, or may be the result of the current drawn from the powered device. The discharge current may be a fraction of the charging current, and is applied to the battery for only a limited time during the charging cycle as compared to the charging current.

15 Claims, 4 Drawing Sheets

CYCLIC BATTERY CHARGER USING CONTINUOUS BATTERY DISCHARGE

TECHNICAL FIELD

This invention relates to battery chargers, and more particularly to battery chargers having cyclic charging cycles.

BACKGROUND

The use of wireless communication systems is growing fixed location. This allows users to, for with users now numbering well into the millions. One of the popular wireless communications systems is the cellular telephone, having a mobile station (or handset) and a base station. Cellular telephones allow a user to talk over the telephone without having to remain in a example, move freely about the community while talking on the phone.

Devices such as a mobile telephones, cordless telephones, and pagers typically use rechargeable batteries as a source of electric power. To enhance the usability of the mobile device, manufacturers are continually attempting to increase the amount of time required before the battery needs to be recharged. It has been found that during battery charging, an ionic barrier may form at the insulator between the cathode and the anode of the battery. As this ionic barrier forms, the capacity of the batteries decreases. Thus, it is desirable to recharge batteries while minimizing the formation of the ionic barrier.

SUMMARY

The present invention is a cyclic battery charger designed to reduce the formation of the ionic barrier. The battery charger applies a current to the battery for a first period of time. To reduce the ionic barrier, a discharge current is applied to the battery for a second period of time. The charging current and discharging current are applied cyclically to the battery during the entire charging period. The discharge current may be applied by the battery charger, or may be the result of the current drawn from the powered device. The discharge current may be a fraction of the charging current, and is applied to the battery for only a limited time during the charging cycle as compared to the charging current.

DESCRIPTION OF DRAWINGS

These and other features and advantages of the invention will become more apparent upon reading the following detailed description and upon reference to the accompanying drawings.

DETAILED DESCRIPTION

Figure 1:
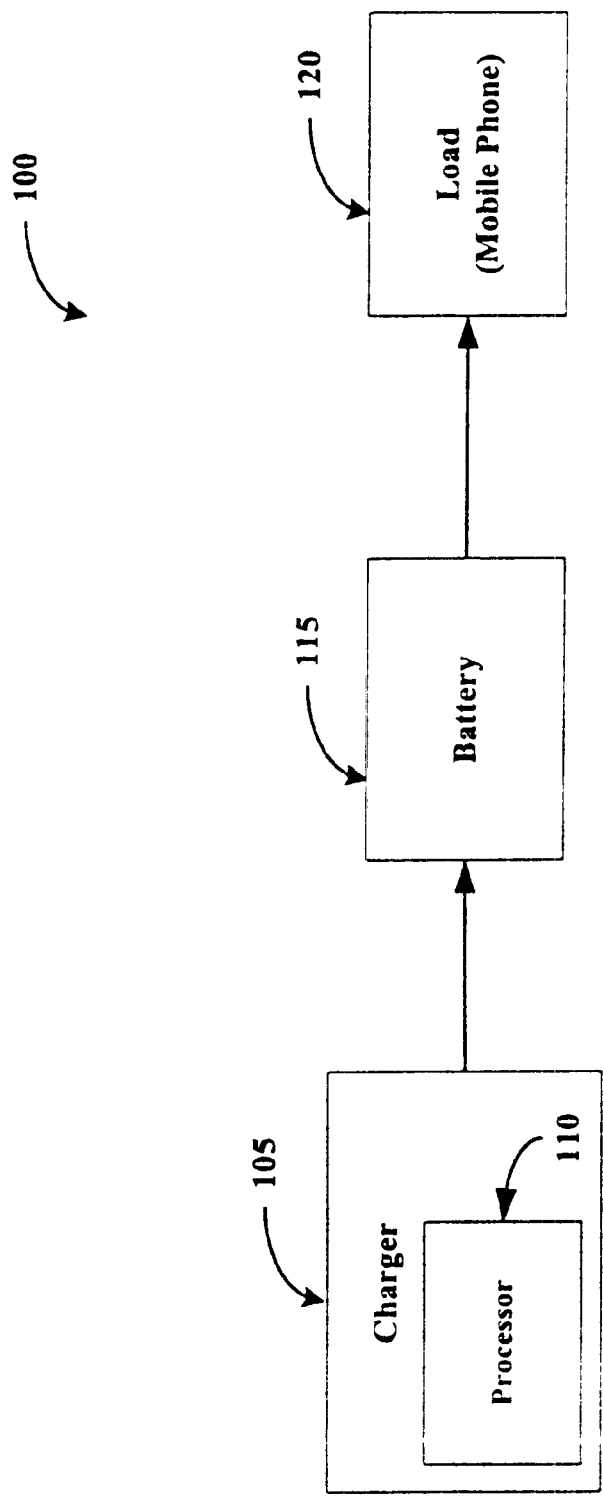
FIG. 1 is a block diagram of a charging system according to one embodiment of the present invention.

FIG. 1 is a block diagram of a charging system 100 according to one embodiment of the present invention. The charging system 100 includes a charger 105 having a processor 110, a battery 115, and a load 120. In this embodiment of the invention, the load 120 is a mobile device such as a cellular telephone, although the invention may function with a variety of loads such as a portable music player, a personal digital assistant, or any other device. The charger 105 supplies a charging current to the battery 115. The charger 105 may be controlled by a processor 110. The processor 110 may control the amount of current supplied by the charger 105 and the duration of time the current is supplied. The processor 110 may be programmed with software, firmware, or any other technique to implement instructions to the processor 110. The processor 110 may also be configured to be able to draw a discharge current from the battery.

In one embodiment, the load 120 draws a discharge current from the battery 115. For example, the load 120 may be a cellular telephone. By leaving the cellular telephone powered in an idle state, the cellular telephone draws a set amount of current from the battery. In one embodiment, the cellular telephone in the idle state draws 100 mA of current. Thus, if the processor stops the charger 105 from supplying current to the battery 115, the battery 115 will begin to be discharged from the cellular telephone. Typically, the charging current is much larger than the current drawn by the load 120. For example, when charging the battery for a cellular telephone, the charging current may be approximately 1 amp, or ten times the discharge current. Of course, other current levels may be used.

Figure 2:
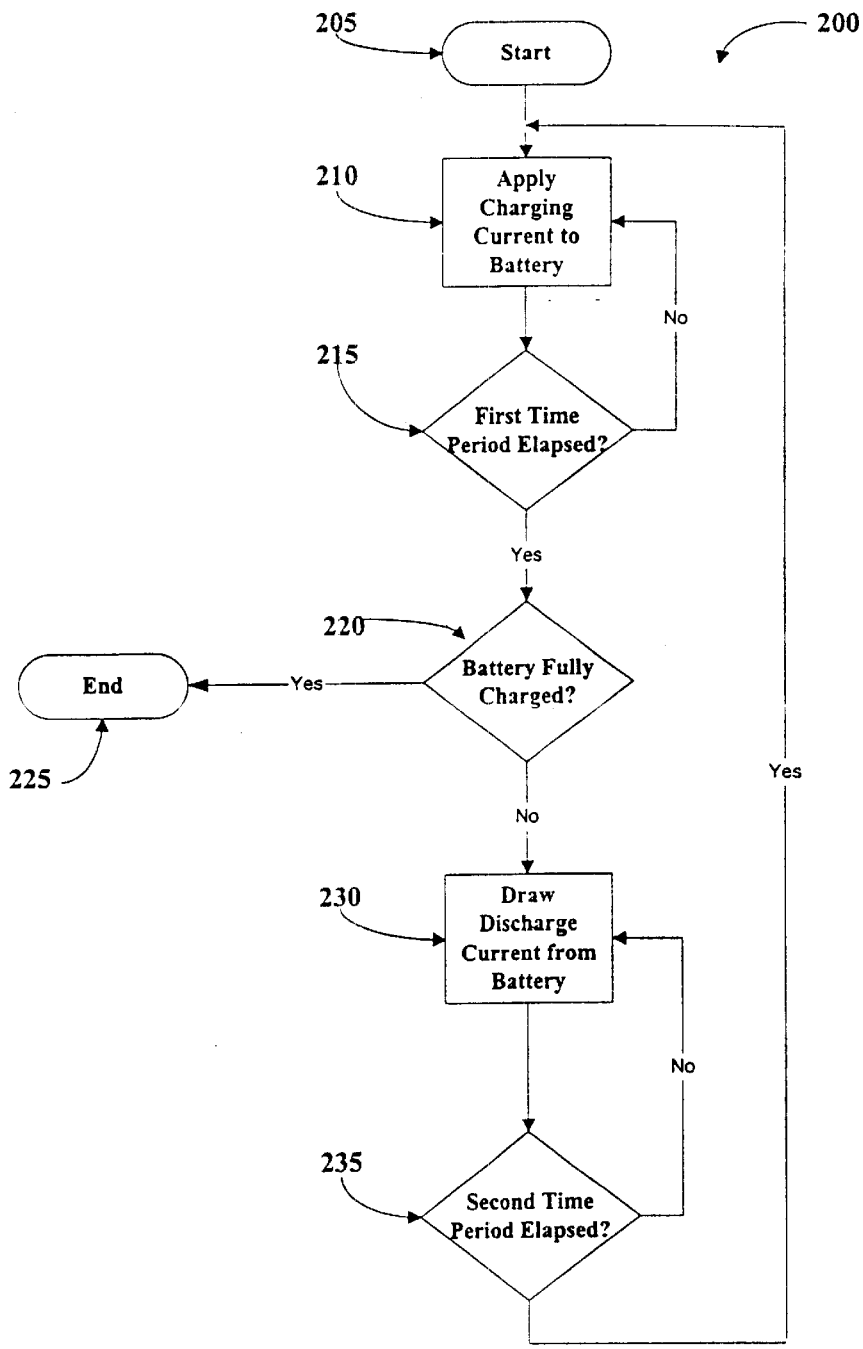
FIG. 2 is a flowchart illustrating the charging technique used by the charging system of FIG. 1.

FIG. 2 is a flowchart illustrating the charging process 200 used by the charging system 100 of FIG. 1. The process 200 may be controlled by the processor 110 and begins in a START state 205. Proceeding to state 210, the charging current is applied to the battery 115. The charging current is typically provided from the charger 105.

Proceeding to state 215, the process 200 determines if a first period of time has elapsed. The battery 115 is being charged in a cyclical process with a first portion of the cycle being used to charge the battery, while the battery is discharged during a second portion of the cycle. The first portion of the cycle consumes most of the cycle time, and may be on the order of 90% of the cycle time. In state 215, the process 200 is determining if the first portion of the cycle is complete. If the first period of time has not elapsed, the process 200 proceeds along the NO branch back to state 210 to continue to apply the charging current to the battery. However, if the first period of time is complete, the process 200 proceeds along the YES brand to block 220.

In block 220, the process 200 determines if the battery 115 is fully charged. Many techniques exist to determine when a battery is fully charged and are well known in the art. Any of these techniques may be used, and are not described herein. If the battery 115 has reached a full charge, the charging process 200 proceeds along the YES branch to terminate in END state 225. If the battery 115 is not fully charged, the process 200 proceeds along the NO branch to block 230.

In block 230, a discharge current is drawn from the battery 115. The discharge current is typically a fraction of the charging current, and may be approximately 10% of the charging current. The discharge current may be drawn by the processor 110 applying a load to the battery 115 through the charger 105. This technique requires the charger 105 to be able to supply and draw current. In another embodiment however, the load 120 is connected to the battery 115, and the processor 110 simply prevents the charger 105 from supplying current to the battery. Thus, the amount of current drawn by the load is the discharge current.

Proceeding to state 235, the process 200 determines if a second period of time has elapsed. As stated above, the battery is discharged during the second portion of the cycle. In state 235, the process 200 is determining if the second portion of the cycle is complete. If the second period of time has not elapsed, the process 200 proceeds along the NO branch back to state 230 to continue to draw the discharge current from the battery. However, if the second period of time is complete, the process 200 proceeds along the YES brand back to block 210 to repeat the cycle by again applying the charging current.

Thus, the process 200 alternates a charging current with a discharge current, applying the charging current for a majority of the cycle and drawing the discharge current for a short portion of the cycle. Further, the discharge current is typically small compared to the charging current, and may be approximately an order of magnitude less than the charging current. By alternating the charging and discharging current, the present invention reduces the formation of the ionic barrier in the battery 115, thus extending the useful battery life.

Figure 3A:
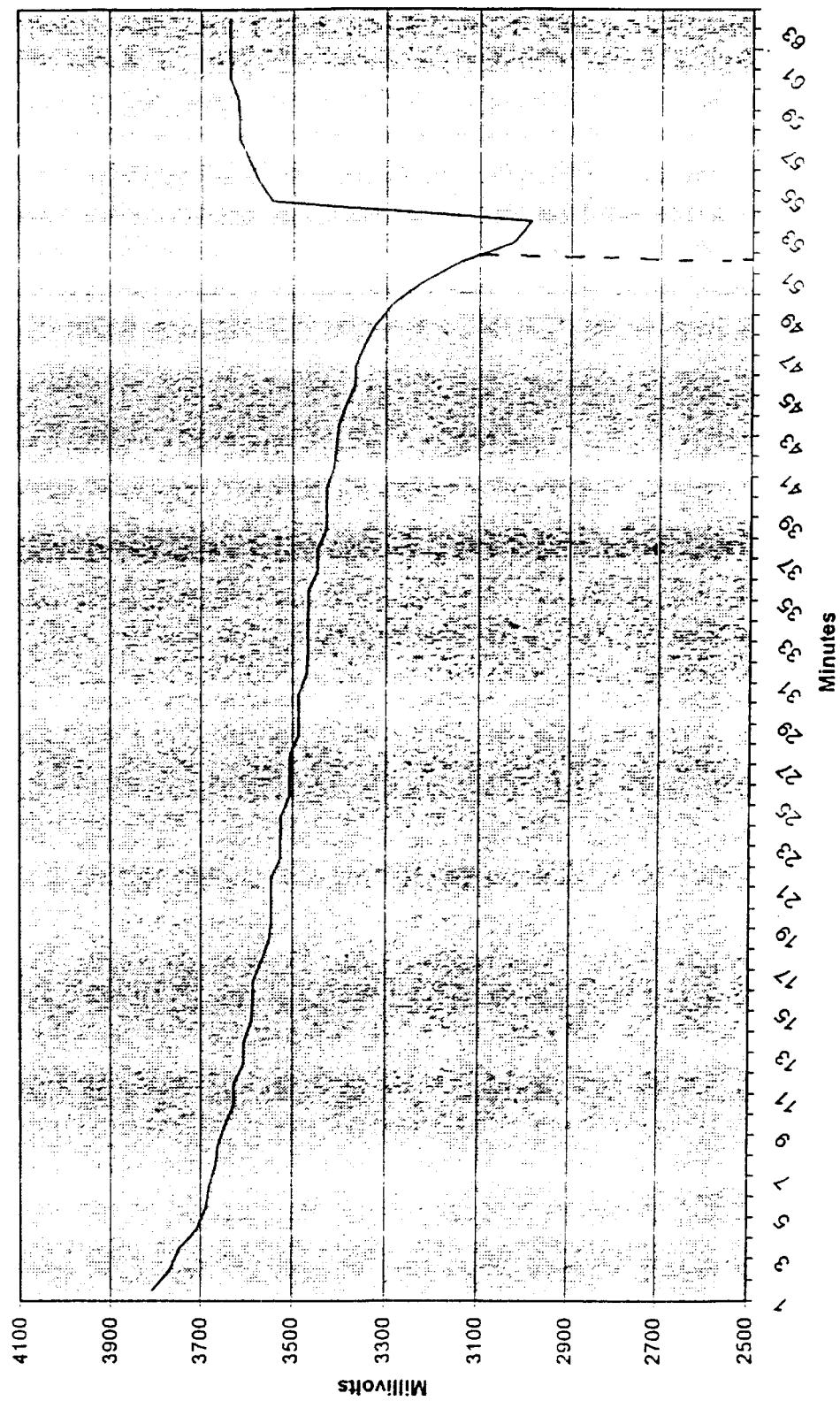
FIG. 3A is a graphical representation of the discharge characteristic of a battery charged without using the cyclical charging technique of the present invention.
Figure 3B:
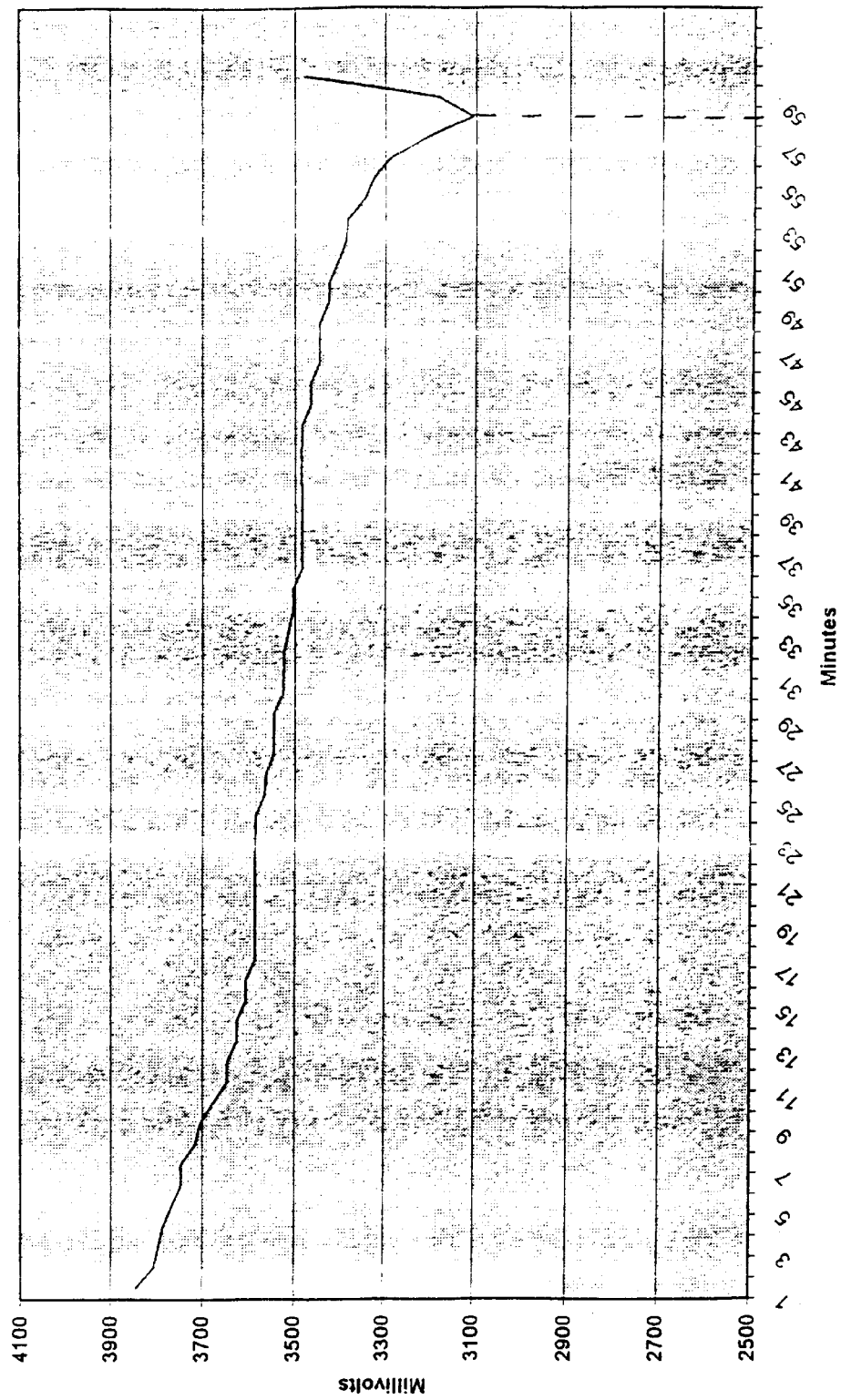
FIG. 3B is a graphical representation of the discharge characteristic of a battery charged using the cyclical charging technique of the present invention.

FIG. 3A is a graphical representation of the discharge characteristic of a battery charged without using the cyclical charging technique of the present invention. In this example, the battery is considered discharged when the voltage supplied by the battery falls below 3100 millivolts. In the test, the battery supplied power for almost 52 minutes before becoming discharged. FIG. 3B is a graphical representation of the discharge characteristic of a similar battery charged using the cyclical charging technique of the present invention. Using the cyclical charging technique, the battery provided power for almost 59 minutes, providing an additional 7 minutes of power. Thus, over 10% more battery life was obtained using the cyclical charging technique.

Numerous variations and modifications of the invention will become readily apparent to those skilled in the art. Accordingly, the invention may be embodied in other specific forms without departing from its spirit or essential characteristics.

What is claimed is:

1. A method of charging a battery comprising:
   a) applying a charging current to the battery for a first portion of a charge cycle;
   b) drawing a continuous discharge current from the battery;
   c) disconnecting the charging current for a second portion of a charge cycle, where the second portion of the charge cycle is a fraction of the first portion of the charge cycle; and
   d) repeating steps a) through c) until the battery is charged.

2. The method of claim 1, wherein the second portion of the charge cycle is approximately 10% of the total charge cycle.

3. The method of claim 1, wherein the discharge current is a fraction of the charging current.

4. The method of claim 3, wherein the discharge current is approximately 10% of the charging current.

5. The method of claim 1, further comprising connecting the battery to a load to draw the discharge current.

6. The method of claim 5, wherein the load is a cellular telephone.

7. The method of claim 1, further comprising terminating the charging cycle when the battery is fully charged.

8. A method of charging a battery in a wireless telephone comprising:
   placing the wireless telephone in an idle state so the wireless telephone continually draws a discharge current from the battery;
   applying a charging current for a first portion of the total cycle time; and
   disconnecting the charging current for a second portion of the total cycle time.

9. The method of claim 8, further comprising setting the charging current to approximately ten times the discharge current.

10. The method of claim 8, further comprising setting the first portion of time to be approximately 90% of the total cycle time.

11. The method of claim 8, further comprising terminating the charging cycle when the battery is fully charged.

12. A battery charging system comprising:
    a charger which supplies a charging current to a battery;
    a load which continually draws a discharge current from the battery; and
    a processor which controls a charging cycle, wherein the processor applies a charging current for a first portion of the charging cycle and disconnects the charging current for a second portion of the charging cycle.

13. The battery charging system of claim 12, wherein the second portion of the charge cycle is approximately 10% of the total charge cycle.

14. The battery charging system of claim 12, wherein the discharge current is a fraction of the charging current.

15. The battery charging system of claim 14, wherein the discharge current is approximately 10% of the charging current.

* * * * *